USO10258882B2

United States Patent
Trombetta et al.

(10) Patent No.: US 10,258,882 B2
(45) Date of Patent: *Apr. 16, 2019

(54) RECORDING COMPANION

(71) Applicant: Microsoft Technology Licensing, LLC, Redmond, WA (US)

(72) Inventors: Steven Trombetta, Seattle, WA (US); Edmund Samuel Victor Pinto, Duvall, WA (US); Todd Ryun Manion, Seattle, WA (US); James Andrew Goossen, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/886,676

(22) Filed: Feb. 1, 2018

(65) Prior Publication Data
US 2018/0154259 A1 Jun. 7, 2018

Related U.S. Application Data

(63) Continuation of application No. 14/606,871, filed on Jan. 27, 2015, now Pat. No. 9,950,257.
(Continued)

(51) Int. Cl.
*A63F 13/49* (2014.01)
*A63F 13/60* (2014.01)
*A63F 13/86* (2014.01)
*A63F 13/497* (2014.01)
*H04N 21/422* (2011.01)
(Continued)

(52) U.S. Cl.
CPC ............ *A63F 13/49* (2014.09); *A63F 13/497* (2014.09); *A63F 13/60* (2014.09); *A63F 13/86* (2014.09); *H04N 21/4223* (2013.01); *H04N 21/42203* (2013.01); *H04N 21/4334* (2013.01); *H04N 21/4781* (2013.01)

(58) Field of Classification Search
CPC ........ A63F 13/49; A63F 13/497; A63F 13/60; A63F 13/86
See application file for complete search history.

(56) References Cited

U.S. PATENT DOCUMENTS 6,674,447 B1 * 1/2004 Chiang ............. G06F 17/30781
345/531
6,699,127 B1 * 3/2004 Lobb ....................... A63F 13/10
345/418

(Continued)

*Primary Examiner* — William H McCulloch, Jr.
(74) *Attorney, Agent, or Firm* — Alleman Hall Creasman & Tuttle LLP

(57) ABSTRACT

Active gameplay of a video game on a computer gaming device is overseen by a platform-level in-game recording companion that executes separately from any of a plurality of different video games. During active gameplay of the video game, the active gameplay is continuously and automatically buffered to a temporary storage buffer. During active gameplay the computer gaming device receives a command to save a segment of the active gameplay for subsequent viewing. While displaying gameplay of the currently-executing video game, an interface for the platform-level in-game recording companion is displayed. The segment of the active gameplay is saved from the temporary storage buffer to a library of the platform-level in-game recording companion.

20 Claims, 11 Drawing Sheets

Related U.S. Application Data

(60) Provisional application No. 61/947,939, filed on Mar. 4, 2014.

(51) Int. Cl.
    *H04N 21/433* (2011.01)
    *H04N 21/478* (2011.01)
    *H04N 21/4223* (2011.01)

(56) References Cited

U.S. PATENT DOCUMENTS

| | | | | |
|---|---|---|---|---|
| 7,502,545 | B2* | 3/2009 | Affaki | H04N 5/45 |
| | | | | 386/248 |
| 8,083,593 | B2* | 12/2011 | White | H04N 5/76 |
| | | | | 463/43 |
| 8,771,083 | B2* | 7/2014 | Horneff | A63F 13/12 |
| | | | | 463/1 |
| 9,005,033 | B2* | 4/2015 | Figueroa | A63F 13/49 |
| | | | | 463/43 |
| 9,278,288 | B2* | 3/2016 | McCarthy | A63F 13/497 |
| 9,498,717 | B2* | 11/2016 | Trombetta | A63F 13/497 |
| 9,795,871 | B2* | 10/2017 | Trombetta | A63F 13/00 |
| 9,950,257 | B2* | 4/2018 | Trombetta | A63F 13/49 |
| 2002/0190991 | A1* | 12/2002 | Efran | H04N 5/2224 |
| | | | | 345/475 |
| 2007/0294089 | A1* | 12/2007 | Garbow | A63F 13/12 |
| | | | | 705/26.1 |
| 2008/0119286 | A1* | 5/2008 | Brunstetter | A63F 13/00 |
| | | | | 463/43 |
| 2008/0320126 | A1* | 12/2008 | Drucker | G06Q 30/00 |
| | | | | 709/224 |
| 2009/0113303 | A1* | 4/2009 | Goossen | A63F 13/10 |
| | | | | 715/719 |
| 2009/0258708 | A1* | 10/2009 | Figueroa | G07F 17/3295 |
| | | | | 463/43 |
| 2010/0105484 | A1* | 4/2010 | Horneff | A63F 13/12 |
| | | | | 463/43 |
| 2012/0100910 | A1* | 4/2012 | Eichorn | H04N 21/43615 |
| | | | | 463/31 |
| 2012/0102373 | A1* | 4/2012 | Waugh | G06F 11/0769 |
| | | | | 714/57 |
| 2013/0274014 | A1* | 10/2013 | Rom | A63F 13/798 |
| | | | | 463/31 |
| 2014/0274297 | A1* | 9/2014 | Lewis | A63F 13/00 |
| | | | | 463/20 |
| 2015/0217196 | A1* | 8/2015 | McCarthy | A63F 13/497 |
| | | | | 463/24 |
| 2015/0224395 | A1* | 8/2015 | Trombetta | A63F 13/497 |
| | | | | 463/24 |
| 2015/0251093 | A1* | 9/2015 | Trombetta | A63F 13/49 |
| | | | | 463/24 |
| 2016/0292732 | A1* | 10/2016 | Kang | G06Q 20/123 |
| 2018/0154259 | A1* | 6/2018 | Trombetta | A63F 13/49 |

* cited by examiner

US 10,258,882 B2

RECORDING COMPANION

CROSS-REFERENCE TO RELATED APPLICATIONS

This application is a continuation of U.S. patent application Ser. No. 14/606,871, filed Jan. 27, 2015, which claims priority to U.S. Provisional Application No. 61/947,939, filed Mar. 4, 2014 and entitled "IN-GAME RECORDING COMPANION", the complete contents of each of which are hereby incorporated herein by reference for all purposes.

BACKGROUND

When viewers watch live video broadcasts, events may occur that may be of particular interest to the viewers. Such events may be recorded in order for the viewers to analyze and enjoy again what has already taken place. Similarly, when users are playing video games, events may occur during live gameplay that are of particular interest to the users, and the users may desire to view such events after they occur or to share such events with others.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Various implementations relating to providing recordings are disclosed. In one implementation, active gameplay of a video game on a computer gaming device is overseen by a platform-level in-game recording companion that executes separately from any of a plurality of different video games. During active gameplay of the video game, the active gameplay is continuously and automatically buffered to a temporary storage buffer. During active gameplay the computer gaming device may receive a command to save a segment of the active gameplay for subsequent viewing. Without interrupting the active gameplay, the segment of the active gameplay is saved from the temporary storage buffer to a library of the platform-level in-game recording companion.

DETAILED DESCRIPTION

In-game recording functionality may be provided for any video game at a platform level of a computer gaming device. For example, during active gameplay of a video game, active gameplay may be buffered to a temporary storage buffer with a platform-level in-game recording companion that is executed separate from any particular video game of the computer gaming device. Upon receipt of a command to save a particular segment of active gameplay, the platform-level in-game recording companion may save the active gameplay segment from the temporary storage buffer to a library of a platform-level in-game recording companion.

Figure 1:
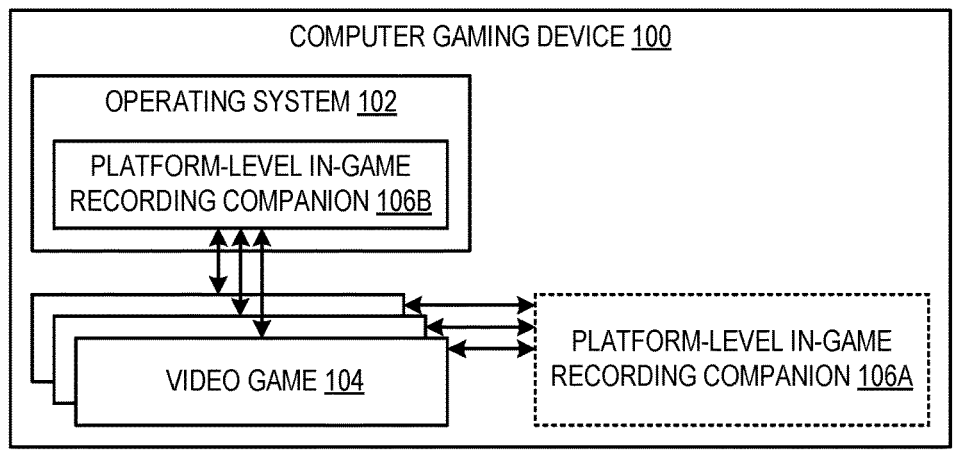
FIG. 1 schematically shows a computer gaming device according to an implementation of this disclosure.

FIG. 1 schematically shows a computer gaming device 100 according to an implementation of this disclosure. The computer gaming device 100 is shown in simplified form. The computer gaming device 100 may take any suitable form including a game console, entertainment computing device, portable gaming device, tablet, laptop, desktop, smartphone, virtual- or augmented-reality device, or other computing device that may be used to execute a video game, live broadcast, and/or other content.

The computer gaming device 100 includes an operating system 102 configured to manage hardware resources of the computer gaming device. Further, the operating system 102 may be configured to monitor, oversee, or otherwise manage operation of various software programs, services, and applications running on the computer gaming device 100. For example, a video game 104 may be executed or played on the computer gaming device and the operating system may manage operation of the video game. The video game 104 may be one of a plurality of different video games that the computer gaming device is configured to play.

Furthermore, a platform-level in-game recording companion 106A and/or platform-level in-game recording companion 106B may be executed on the computer gaming device. In particular, the platform-level in-game recording companion may be executed separately from the video game 104 and any other video games of the plurality of different video games configured to be played on the computer gaming device 100. In one example, a platform-level in-game recording companion 106A is an application that runs while the video game is being played. In another example, a platform-level in-game recording companion 106B is a part of the operating system. It will be noted that the platform-level in-game recording companion may also be used to record video content other than video games, such as a live broadcast or any other content being displayed.

The platform-level in-game recording companion may be configured to oversee any currently playing video game or other content on the computer gaming device 100 and provide in-game recording functionality for that currently playing video game. In particular, since the platform-level in-game recording companion is executed at the platform level and not within any particular video game, the in-game recording functionality provided by the platform-level in-game recording companion may be the same for every video game played on the computer gaming device. Moreover, video games that are compatible with the computer gaming device may be made less complex relative to video games with built-in game specific in-game recording functionality.

Game developers need not design game-specific in-game recording experiences. Rather, every video game may interface with the platform-level in-game recording companion for in-game recording functionality without additional effort from the developer. Such in-game recording functionality will be discussed in further detail below with reference to an in-game digital video recording method 300 shown in FIG. 3, in-game digital video recording method 400 shown in FIG. 4, and in-game digital video recording method 500 shown in FIG. 5.

Figure 2:
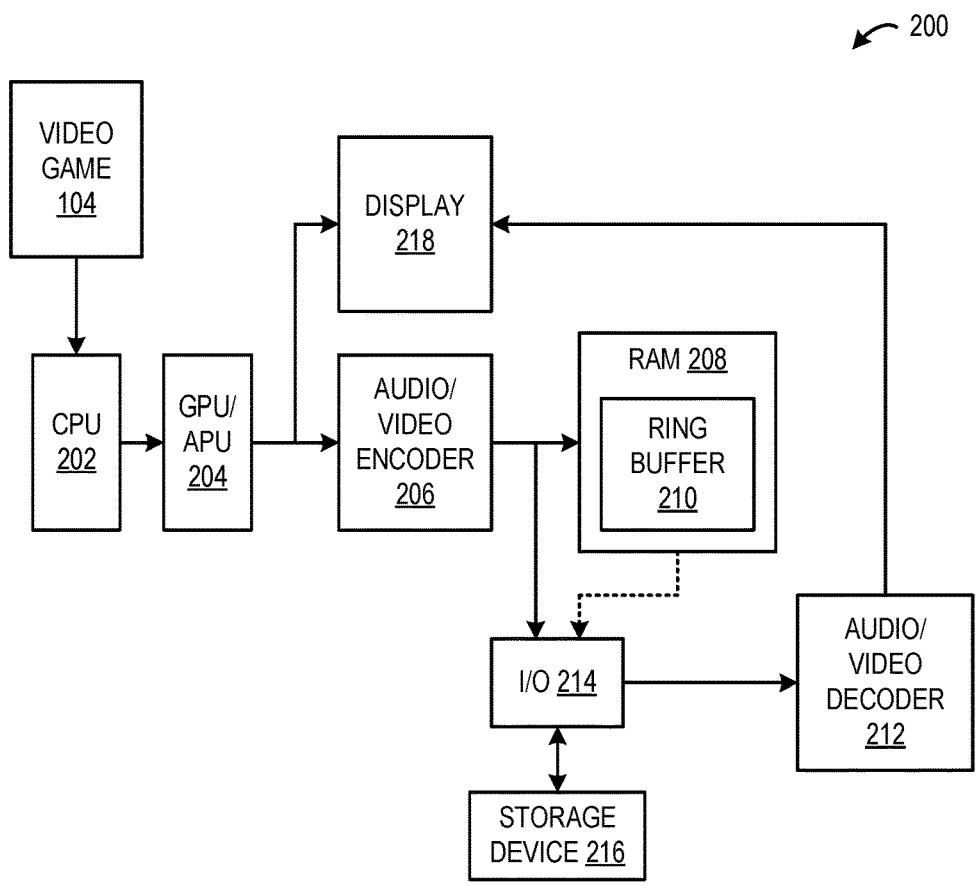
FIG. 2 schematically shows a graphics pipeline of a computer gaming device according to an implementation of this disclosure.

FIG. 2 schematically shows a graphics and audio pipeline 200 according to an implementation of this disclosure. The graphics and audio pipeline may be implemented in the computer gaming device 100 shown in FIG. 1, or various stages of the graphics pipeline may be distributed throughout two or more different computing devices (e.g., a local gaming machine and a remote computing system running a gaming service). The graphics and audio pipeline 200 enables platform-level in-game recording functionality.

The graphics and audio pipeline 200 comprises one or more central processing units (CPU) 202, one or more graphics processing and audio processing units (GPU/APU) 204, an audio/video encoder 206, a random access memory (RAM) device 208 including a ring buffer 210, an audio/video decoder 212, an input/output interface device 214, a storage device 216, and a display 218. It will be understood that the graphics and audio pipeline may include additional and/or alternative processing logic and other hardware blocks without departing from the scope of this disclosure. It will be further understood that the graphics processing and audio processing at GPU/APU 204 may be performed at a single unified processing circuit as illustrated or at separate processing circuits.

In one example, the CPU 202 fetches game instructions from the video game 104. The CPU 202 decodes the instructions into game data including drawing instructions for rendering video imagery of gameplay and sound instructions for producing audio data to be provided to speakers to produce the gameplay audio of the video game of the video game 104. The CPU 202 passes the drawing instructions, sound instructions, and other game data to the GPU/APU 204. The GPU/APU 204 executes the drawing instructions to produce rendered image frames of the video game 104 and the sound instructions to produce the audio data to be provided to the speakers to produce the gameplay audio of the video game 104 (collectively referred to as active gameplay data). For example, the image frames rendered by the GPU/APU 204 may be uncompressed image data (e.g., every pixel in an image frame has full color definition). Similarly, the audio data produced by GPU/APU 204 may be uncompressed. The GPU/APU 204 sends the active gameplay data for display on the display 218.

Additionally, the GPU/APU 204 sends the rendered image frames and the audio data of the active gameplay to the audio/video encoder 206 to be compressed or otherwise encoded. For example, the rendered image frames and the audio data may be encoded into MPEG-4, H.264, or another suitable audio/visual format. Alternatively, the rendered image frames and the audio data may be encoded separately in a suitable video only format and a suitable audio only format. The audio/video encoder 206 sends the encoded active gameplay data to the RAM device 208 for buffering in the ring buffer 210. The RAM device 208 may include any suitable type of memory including SDRAM (e.g., DDR, GDDR, etc.). Moreover, the RAM device 208 may be any suitable size.

In some implementations, the CPU and the GPU/APU may be combined in a single package. In some implementations, the CPU or the GPU/APU may be omitted. In some implementations, the RAM device may be integrated with the CPU and/or GPU/APU in a system-on-chip (SOC) configuration.

The ring buffer 210 may be automatically and continuously loaded with active gameplay data from the audio/video encoder 206 until filled. Once the ring buffer 210 is filled, an oldest portion of active gameplay data may be overwritten with new active gameplay data. Accordingly, a most recently played portion of active gameplay from a currently playing video game may be automatically buffered in the ring buffer 210 in a continuous fashion. The ring buffer 210 may be any suitable size. In one example, the ring buffer 210 has a capacity of five minutes worth of active gameplay data. In other words, the ring buffer continuously buffers the most recent five minutes of gameplay of the currently playing video game.

It will be understood that the ring buffer is merely one example of a storage mechanism, and the active gameplay data may be stored in the RAM device in any suitable fashion. For example, the active gameplay may be buffered in any suitable storage mechanism that abides by the first-in-first-out (FIFO) principle. In other words, any storage device that may function as a temporary storage buffer for the active gameplay data.

When an in-game recording is requested during active gameplay of the currently playing video game, an active gameplay segment from the most recently played portion of active gameplay buffered in the ring buffer 210 may be saved to a library of a platform-level in-game recording companion on the storage device 216 via I/O 214. A variety of different active gameplay segments can be saved to the storage device 216 in this manner. Thus, the variety of different active gameplay segments may be simultaneously stored by the storage device 216. Any of the different active gameplay segments may be independently accessed at a later time (e.g., for viewing, editing, sharing, etc.). When a particular active gameplay segment is accessed for viewing, the information pertaining to that segment may be provided from the storage device 216 to an audio/video decoder 212. The audio/video decoder 212 decodes the encoded gameplay data of the saved active gameplay segment into uncompressed image data and sends the uncompressed image data directly to the display 218. The display 218 displays the saved active gameplay segment. Additionally, the audio/video decoder 212 decodes the encoded gameplay data of the saved active gameplay segment into uncompressed audio data which may be sent to the speakers to produce the gameplay audio of the active gameplay segment.

It will be understood that the saved active gameplay segment may include any suitable amount of the active gameplay data stored in the ring buffer. For example, the saved gameplay segment may include some or all of the active gameplay data stored in the ring buffer. In one example, a default length of the saved active gameplay segment is thirty seconds. In some implementations, a length of the saved active gameplay segment used for in-game recording may be adjusted via the platform-level in-game recording companion. In some implementations, a length of the saved gameplay segment used for in-game recording may be adjusted on a per video game basis, or a per gameplay scenario basis, for example according to a parameter specified by the video game via an application programming interface (API).

It will be understood that because the gameplay data that is buffered to the ring buffer is rendered by the GPU/APU prior to being buffered, the buffered active gameplay segment may be saved directly from the ring buffer without having to be reprocessed by the GPU/APU. Such an approach facilitates saving of a segment of active gameplay on demand with little or no performance loss. On the other hand, if game data that is not rendered is buffered to the ring buffer, then the game data may be rendered by the GPU/APU before being saved.

In some implementations, the audio/video encoder 206 and the audio/video decoder 212 may be incorporated with the RAM device 208, and the GPU/APU 204 sends the rendered image data and the audio data corresponding to the active gameplay directly to the RAM device. Correspondingly, in such implementations, the RAM device 208 may send a buffered gameplay segment directly to the display 218 for immediate viewing.

Encoded active gameplay data may be sent to the storage device 216 for long term storage based on a variety of different triggers. For example, the active gameplay data may be sent to the storage device 216 in response to user selection of a particular gameplay segment of the currently playing video game that the user desires to view again at a later time. In another example, the video game may automatically select a particular gameplay segment for storage in the storage device 216. For example, a gameplay segment may be automatically selected for storage in a video game DVR responsive to a user achieving a new high score, accomplishing a game-determined feat (e.g., defeating AI boss, defeating multi-player opponent, encountering multi-player friend, etc.), or otherwise having an in-game experience that the video game deems worthy.

For storage of active gameplay data, the audio/video encoder 206 and/or the RAM 208 sends the encoded active gameplay data to the input/output interface device 214, and the input/output interface device 214 performs a write operation to write the encoded active gameplay data to the storage device 216. Correspondingly, for retrieval of active gameplay data, the input/output interface device 214 performs a read operation on the storage device 216 to retrieve the encoded active gameplay data. It will be understood that the storage device may take any suitable form including an internal or external hard disk drive, solid state drive, network accessible storage service, and/or other suitable storage device(s).

In some implementations, the audio/video encoder 206 and the audio/video decoder 212 may be incorporated with the RAM device 208 or otherwise bypassed, and the GPU/APU 204 may send the rendered image data and the audio data corresponding to the active gameplay directly to the input/output interface device 214 for storage on the storage device 216.

It is to be understood that by automatically and continuously buffering the active gameplay of the currently playing video game to the RAM device, the most recently played portion of active gameplay from the currently playing video game may be available for storage. In particular, since the active gameplay may be stored directly from the RAM device without any additional read/write operations, the active gameplay may be stored with little or no performance loss.

Figure 3:
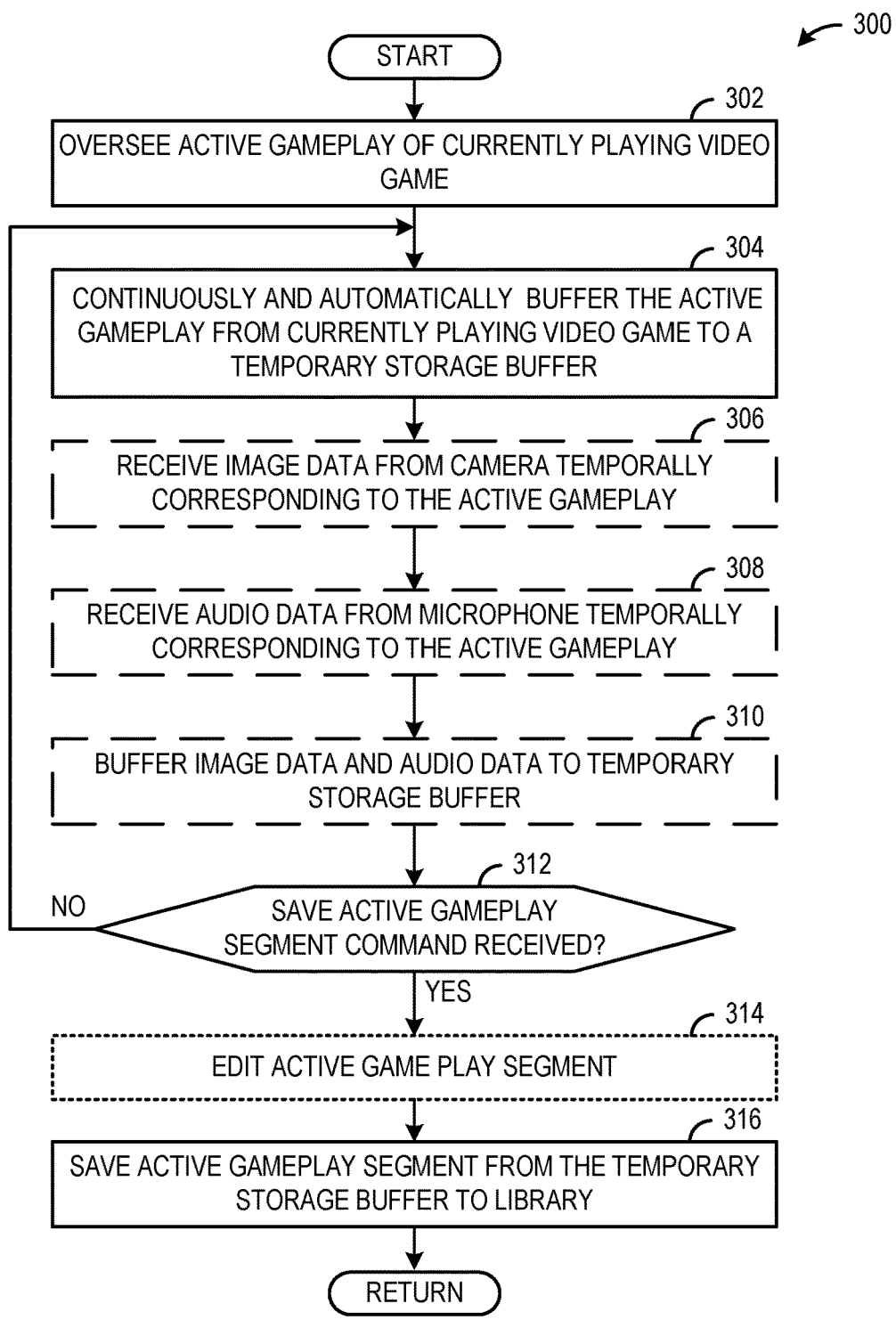
FIG. 3 shows a digital video recording method for video games according to an implementation of this disclosure.

FIG. 3 shows an in-game digital video recording method 300 for video games and/or other content according to an implementation of this disclosure. For example, the in-game digital video recording method 300 may be performed with the platform-level in-game recording companion of the computer gaming device 100 shown in FIG. 1.

At 302, the method 300 may include overseeing active gameplay of a video game with a platform-level in-game recording companion that executes separately from the video game. For example, the platform-level in-game recording companion may monitor game events to recognize when an in-game recording is to be stored.

At 304, the method 300 may include continuously and automatically buffering the active gameplay to a temporary storage buffer of the computer gaming device. For example, rendered image frames and audio data of active gameplay may be continuously encoded and stored in a ring buffer of a RAM device while the currently playing video game is being played.

At 306, the method 300 may optionally include receiving from a camera image data temporally corresponding to a segment of active gameplay. For example, image data of a user playing the game may be captured by a camera peripheral connected to the computer gaming device. The image data may then be provided to the computer gaming device and buffered with and/or incorporated with the temporally corresponding active gameplay in the storage buffer.

At 308, the method 300 may optionally include receiving from a microphone audio data temporally corresponding to a segment of active gameplay. For example, audio data of a user playing the game may be captured by a microphone peripheral connected to the computer gaming device. The audio data may then be provided to the computer gaming device and may be buffered with and/or incorporated with the temporally corresponding active gameplay in the temporary storage buffer.

At 310, the method 300 may optionally include buffering the image data from 306 and the audio data from 308 to the temporary storage buffer.

At 312, the method 300 may include, during active gameplay of the video game, determining whether a command to save an active gameplay segment for subsequent viewing is received. In some cases, receiving the command to save a segment of the active gameplay may include recognition of a programmatically defined trigger event within the active gameplay of the video game. For example, during active gameplay of a soccer simulation videogame, the platform-level in-game recording companion may recognize the scoring of a goal as a command to save the active gameplay including the scoring of the goal.

In other cases, receiving the command to save the segment of active gameplay may include receiving the command via a microphone. In other cases, receiving the command to save the segment of active gameplay may include receiving a command sent from a companion computing device via a network connection. It will be understood that the command to save the segment of active gameplay may also include gesture recognition, controller input, interaction with an interface of the platform-level in-game recording companion, or any other suitable interaction with the computer gaming device. If it is determined that a command to save the segment of active gameplay is given, then the method 300 moves to 314 or 316. Otherwise, the method 300 returns to 304.

Optionally, at 314, the method 300 may include editing the active gameplay segment prior to saving the gameplay segment to the library of the platform-level in-game recording companion. For example, a start time, a stop time, and a length of the saved active gameplay segment may be specified by the user via transport controls provided by the platform-level in-game recording companion. The user may be provided with instant editing options, including options for combining the active gameplay segment with other recorded content, including voice-over, video-over, etc. The other recorded content may be recorded simultaneously with or separately from the active gameplay segment. Combining the other recorded content may include overlaying the content on top of a portion of the active gameplay segment, such as placing a combined video-over recording on top of a portion of the active gameplay segment, or decreasing the volume of the active gameplay in order to better hear a combined voice-over. Additionally, editing may include inputting metadata to associate with the active gameplay segment, such as a title, annotations, tags, etc. It will be understood that the platform-level in-game recording companion may provide any suitable transport or editing controls for editing the active gameplay segment.

At 316, the method 300 may include, without interrupting active gameplay of the videogame, saving a segment of active gameplay from the temporary storage buffer to a library of the platform-level in-game recording companion. In some implementations, the gameplay segment may be saved directly from the ring buffer of the RAM device to storage associated with the library of the platform-level in-game recording companion. For example, a portion of a hard disk drive may be allocated for the platform-level in-game recording companion, and the segment of active gameplay may be written to the hard disk drive for long term storage and playback at a later time. Further, in some implementations, the segment of active gameplay may be sent to a remote computing machine via a service for sharing the gameplay clip with other users.

In some cases, the segment of active gameplay saved may include active gameplay that precedes the command (e.g., save a predetermined or selected duration of gameplay leading up to the command). In other cases, the segment of active gameplay saved may include active gameplay that follows the command. In the cases above, the duration of the segment of active gameplay saved may be configurable to include any suitable duration not to exceed the capacity of the temporary storage buffer. Furthermore, the platform-level in-game recording companion may be configured such that the active gameplay segment includes gameplay preceding and following the command. For example, upon receipt of the command to save the segment of active gameplay, the platform-level in-game recording companion may save a segment including thirty seconds of active gameplay preceding the command and 30 seconds of active gameplay following the command.

In other implementations, the duration of the segment of active gameplay may be defined by the receipt of multiple commands denoting a beginning and an end of the segment of active gameplay. These implementations will be discussed in detail with reference to FIG. 4.

Figure 4:
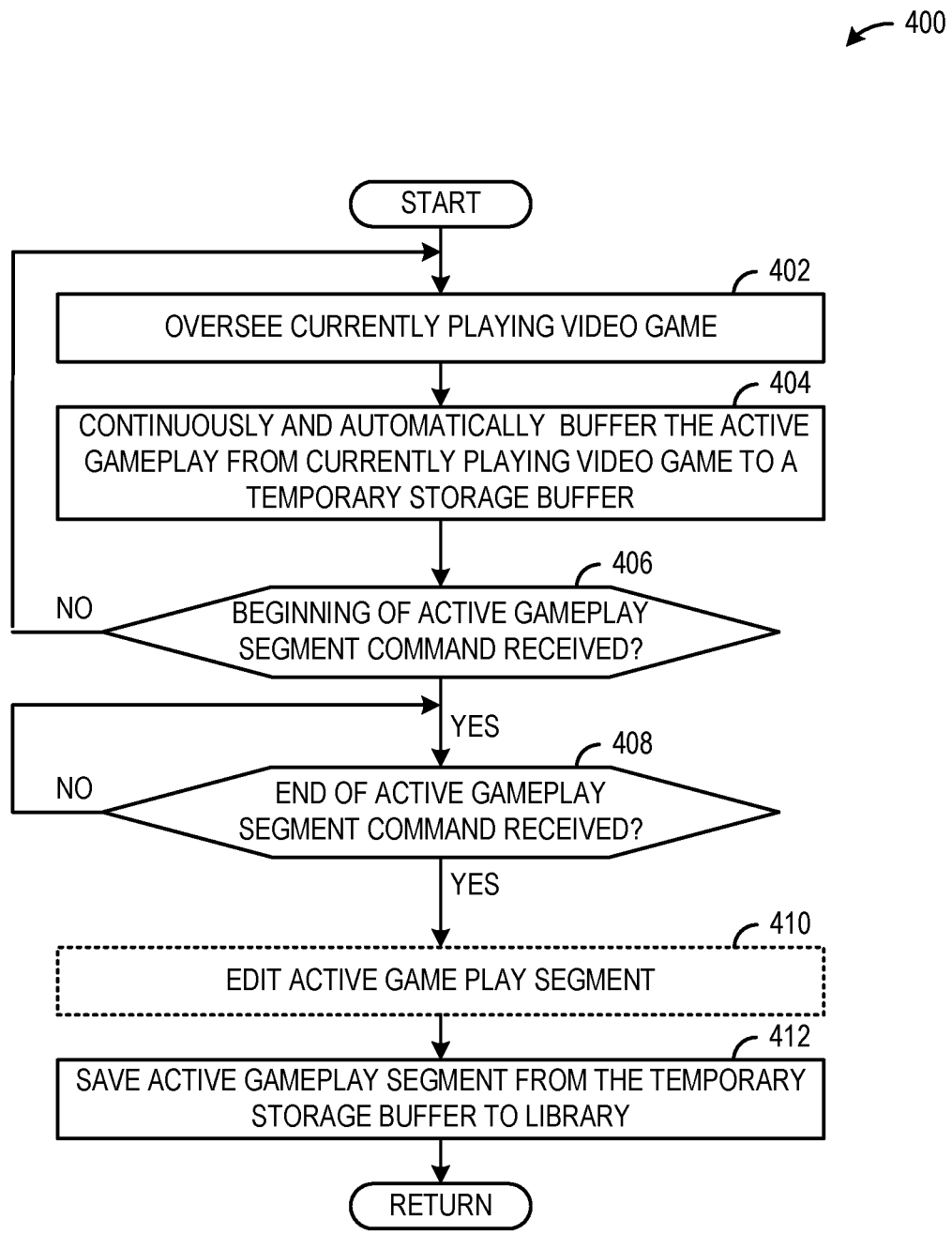
FIG. 4 shows a digital video recording method for video games according to an implementation of this disclosure.

FIG. 4 shows an in-game digital video recording method 400 for video games according to an implementation of this disclosure. For example, the in-game digital video recording method 400 may be performed with the platform-level in-game recording companion of the computer gaming device 100 shown in FIG. 1

At 402, the method 400 may include overseeing active gameplay of a video game with a platform-level in-game recording companion that executes separately from the video game. For example, the platform-level in-game recording companion may monitor game events to recognize when an in-game segment of active gameplay is to be saved.

At 404, the method 400 may include continuously and automatically buffering the active gameplay to a temporary storage buffer of the computer gaming device. For example, rendered image frames and audio data of active gameplay may be continuously encoded and stored in a ring buffer of a RAM device while the currently playing video game is being played.

Figure 13:
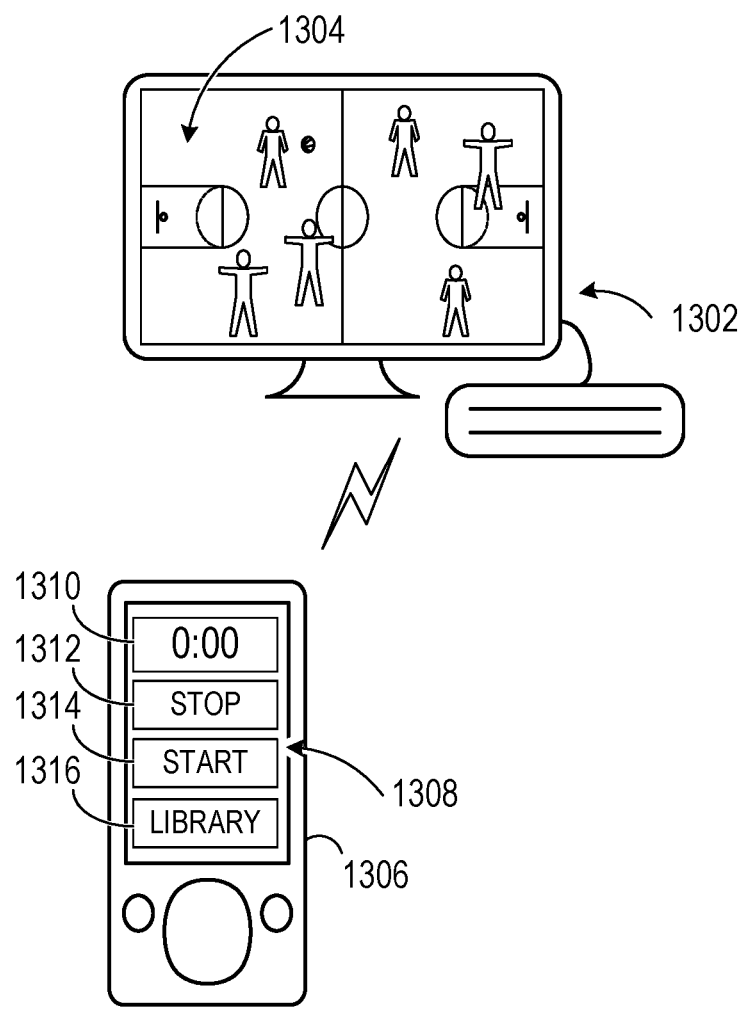
FIG. 13 shows an example of a companion computing device according to an implementation of this disclosure.

At 406, the method 400 may include, during active gameplay of the video game, determining whether a first command indicating a beginning of the segment of the active gameplay is received. In some cases, the command may be generated through determining that a programmatically defined trigger event within the video game has occurred as discussed above. In some cases, the command indicating the beginning of a segment of active gameplay may be given via user input, by voice command, gesture, or controller input, for example. Additionally, the platform-level in-game recording companion may display an interface including executable objects configured to effectuate issuance of the command in a split screen layout with the active gameplay as shown in FIGS. 6-9. The interface of the platform-level in-game recording companion may also be sent to a companion computing device over a network as shown in FIG. 13.

If it is determined that a command indicating the beginning of a segment of active gameplay is received, then the method 400 moves to 408. Otherwise, the method 400 returns to 402.

At 408, the method 400 may include, during active gameplay of the videogame, determining whether a second command indicating an end point of the segment of the active gameplay is received. As discussed above for the command to indicate the beginning of the segment of active gameplay, the command may be received via a programmatically defined trigger within active gameplay, voice command, user interaction with the interface of the platform-level in-game recording companion, or other suitable mechanism. If it is determined that a command indicating the end point of the segment of active gameplay is received, then the method 400 moves to 410 or 412. Otherwise, the method 400 returns to 408.

Optionally, at 410, the method 400 may include editing the active gameplay segment prior to saving the gameplay segment to the library of the platform-level in-game recording companion as discussed above.

At 412, the method 400 includes, without interrupting active gameplay of the videogame, saving the segment of active gameplay, as defined by the commands indicating the beginning and end point of the segment of active gameplay, from the temporary storage buffer to a library of the platform-level in-game recording companion. It will be understood that saving the segment of active gameplay from the temporary storage buffer to the library of the platform-level in-game recording companion may be performed as described above.

Figure 5:
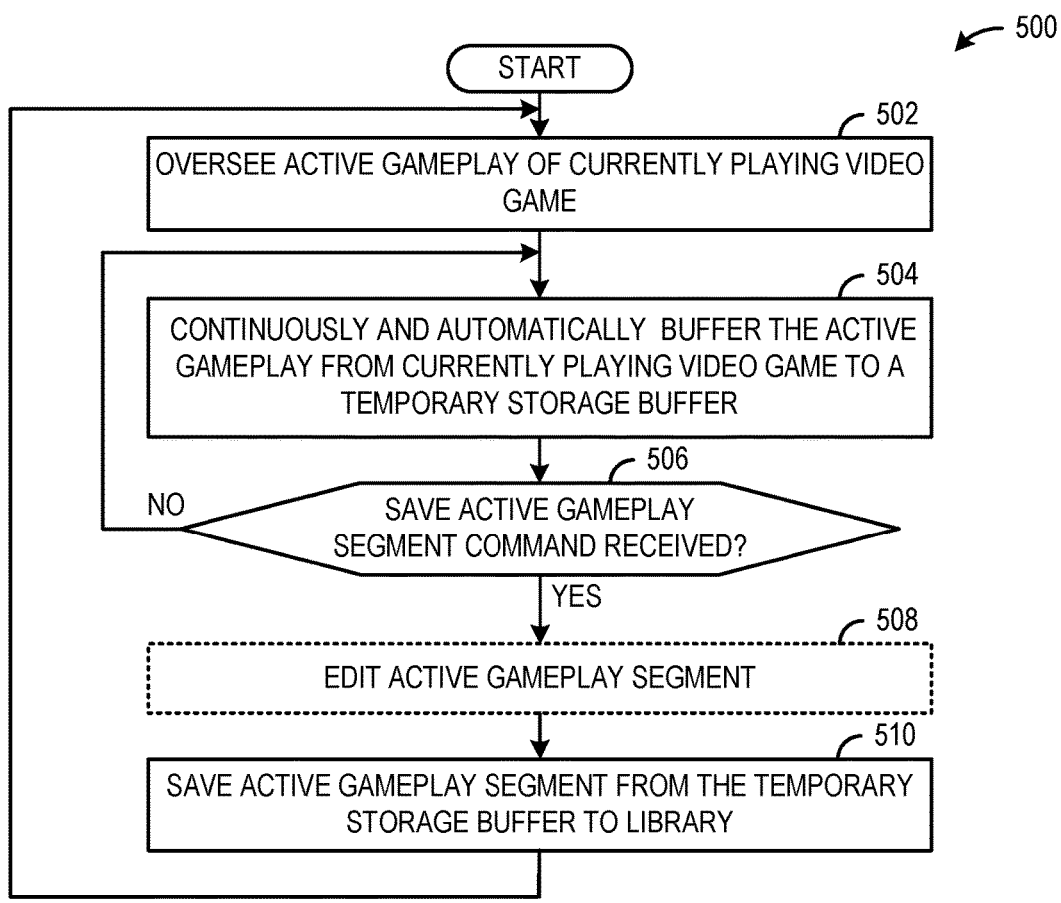
FIG. 5 shows a digital video recording method for video games according to an implementation of this disclosure.

FIG. 5 shows an in-game digital video recording method 500 for video games and/or other content according to an implementation of this disclosure. For example, the in-game digital video recording method 500 may be performed with the platform-level in-game recording companion of the computer gaming device 100 shown in FIG. 1.

At 502, the method 500 may include overseeing active gameplay of a video game with a platform-level in-game recording companion that executes separately from the video game. For example, the platform-level in-game recording companion may monitor game events to recognize when an in-game recording is to be stored.

At 504, the method 500 may include continuously and automatically buffering the active gameplay to a temporary storage buffer of the computer gaming device. For example, rendered image frames and audio data of active gameplay may be continuously encoded and stored in a ring buffer of a RAM device while the currently playing video game is being played.

At 506, the method 500 may include, during active gameplay of the videogame, determining whether a command to save a segment of active gameplay for subsequent viewing is received. It will be understood that the platform-level in-game recording companion may receive the command to save the segment of active gameplay as described above for FIG. 3. If it is determined that command to save the segment of active gameplay is given, then the method 500 moves to 508 or 510. Otherwise, the method 500 returns to 504.

Optionally, at 508, the method 500 may include editing the active gameplay segment prior to saving the gameplay segment to the library of the platform-level in-game recording companion as described above.

At 510, the method 500 may include, without interrupting active gameplay of the videogame, saving a segment of active gameplay from the temporary storage buffer to a library of the platform-level in-game recording companion. It will be understood that saving the segment of active gameplay from the temporary storage buffer to the library of the platform-level in-game recording companion may be performed as described above.

After saving the segment of the active gameplay to the library of the platform-level in-game recording companion, the method 500 may continue active gameplay of the video game. As such, the method 500 returns to 502. As such, without interrupting active gameplay of the videogame, a second, third, fourth, etc. segment of active gameplay may be saved from the temporary storage buffer to a library of the platform-level in-game recording companion. Each subsequent segment may be saved independent of the other segments. Further, two or more segments may be saved without active gameplay ever being interrupted.

The above described methods facilitate in-game recording of any currently playing video game playing on a computer gaming device. In particular, because the method is performed with the platform-level in-game recording companion, the in-game recording functionality works for any video game that is compatible with the computer gaming device. Moreover, the in-game recording experience is the same for any of the video games. For example, the platform-level in-game recording companion may have the same visual appearance and controls regardless of the particular game with which it is being used.

FIGS. 6-9 show an interface for the platform-level in-game recording companion 602 displayed alongside a currently playing video game 604. As shown in the illustrated examples, the platform-level in-game recording companion is snapped to the right of the currently playing video game. However, other arrangements may be implemented. In the examples of FIGS. 6-9, the currently playing video game 604 may be continuously executed with full game action. The currently playing video game need not pause, stop, or be switched away from or put out of focus, in order to effectuate in-game recording.

Figure 6:
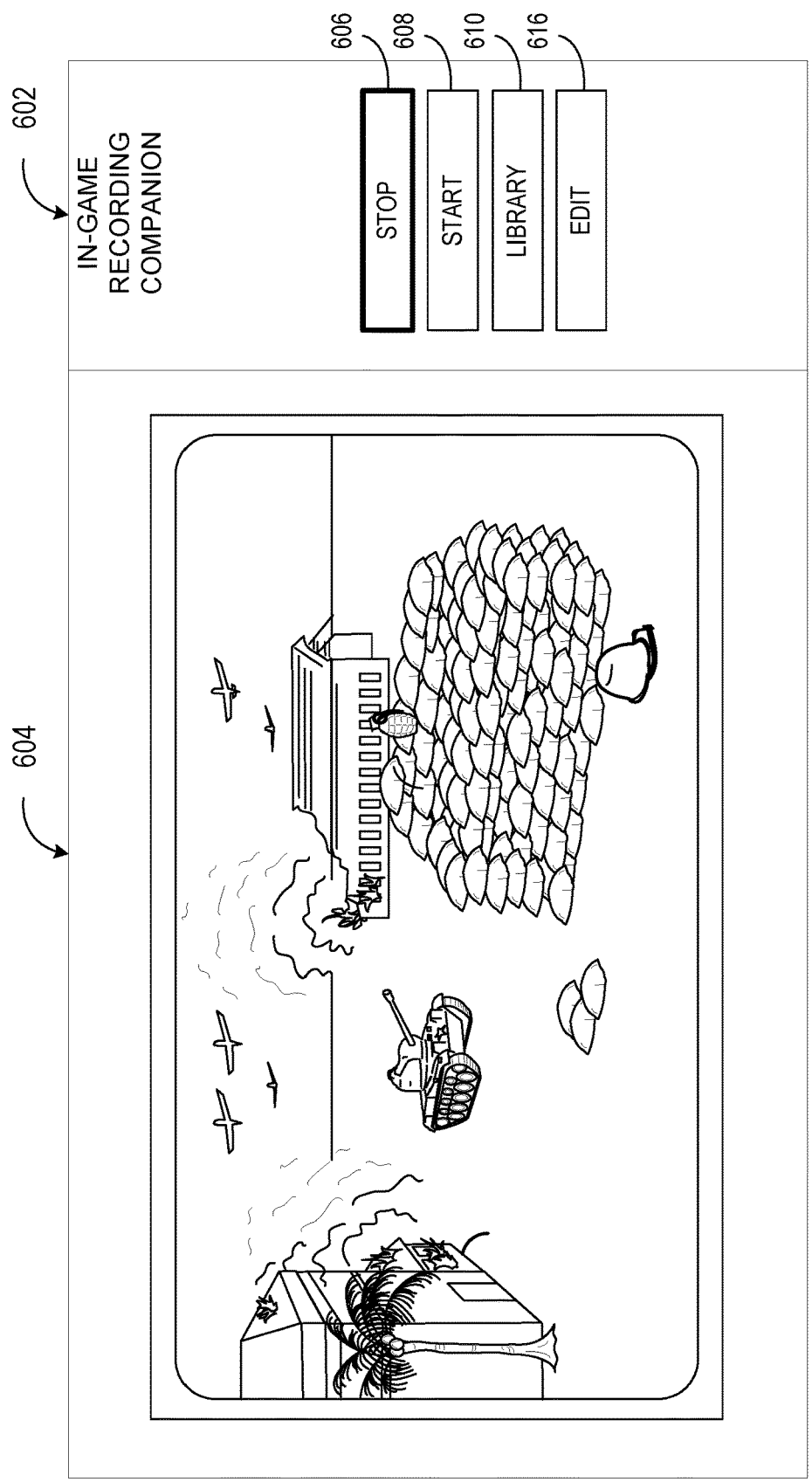
FIGS. 6-9 show examples of an in-game recording companion alongside a currently playing video game.

FIG. 6 shows that the interface for the platform-level in-game recording companion 602 includes various executable objects 606, 608, and 610 for managing in-game recordings. For example, executable stop object 606 may be configured to effectuate issuance of a command indicating an endpoint of a segment of active gameplay. Executable start object 608 may be configured to effectuate issuance of a command indicating a beginning of a segment of active gameplay. Executable display object 610 may be configured to effectuate viewing a library of the platform-level in-game recording companion where previously saved segments of active gameplay may be accessed.

Executable edit object 616 may be configured to effectuate issuance of a command to edit the segment of the active gameplay. Upon execution of edit object 616, platform-level in-game recording companion 602 may provide additional editing functionality to the user. For example, platform-level in-game recording companion 602 may provide the user options to select a duration of active gameplay within the segment of active gameplay to remove from the segment of active gameplay, thus clipping extraneous active gameplay from the segment of active gameplay. Furthermore, platform-level in-game recording companion 602 may allow the user to combine two or more different segments of active gameplay. Platform-level in-game recording companion 602 may allow the user to remove or suppress audio and/or image data corresponding to the segment of active gameplay (e.g., received locally from a camera/microphone). Further, additional audio data and/or chat log data from social interactions temporally corresponding to the segment of active gameplay may be removed. Thus, the editing functionality provided by platform-level in-game recording companion may be employed by the user to protect the privacy of the user. Such editing functionality may be accessible via Executable edit object 616, another user interface element, voice command, a game controller button, and/or any other suitable mechanism.

The platform-level in-game recording companion 602 may be configured to save segments of active gameplay without obscuring the currently playing video game. The platform-level in-game recording companion may be simultaneously displayed in a snapped configuration, as illustrated. Alternatively, the platform-level in-game recording companion may be executed without a GUI component. In either example, commands may be provided to the companion via voice, gesture, controller, or any other suitable mechanism while the game is unobscured.

Figure 7:
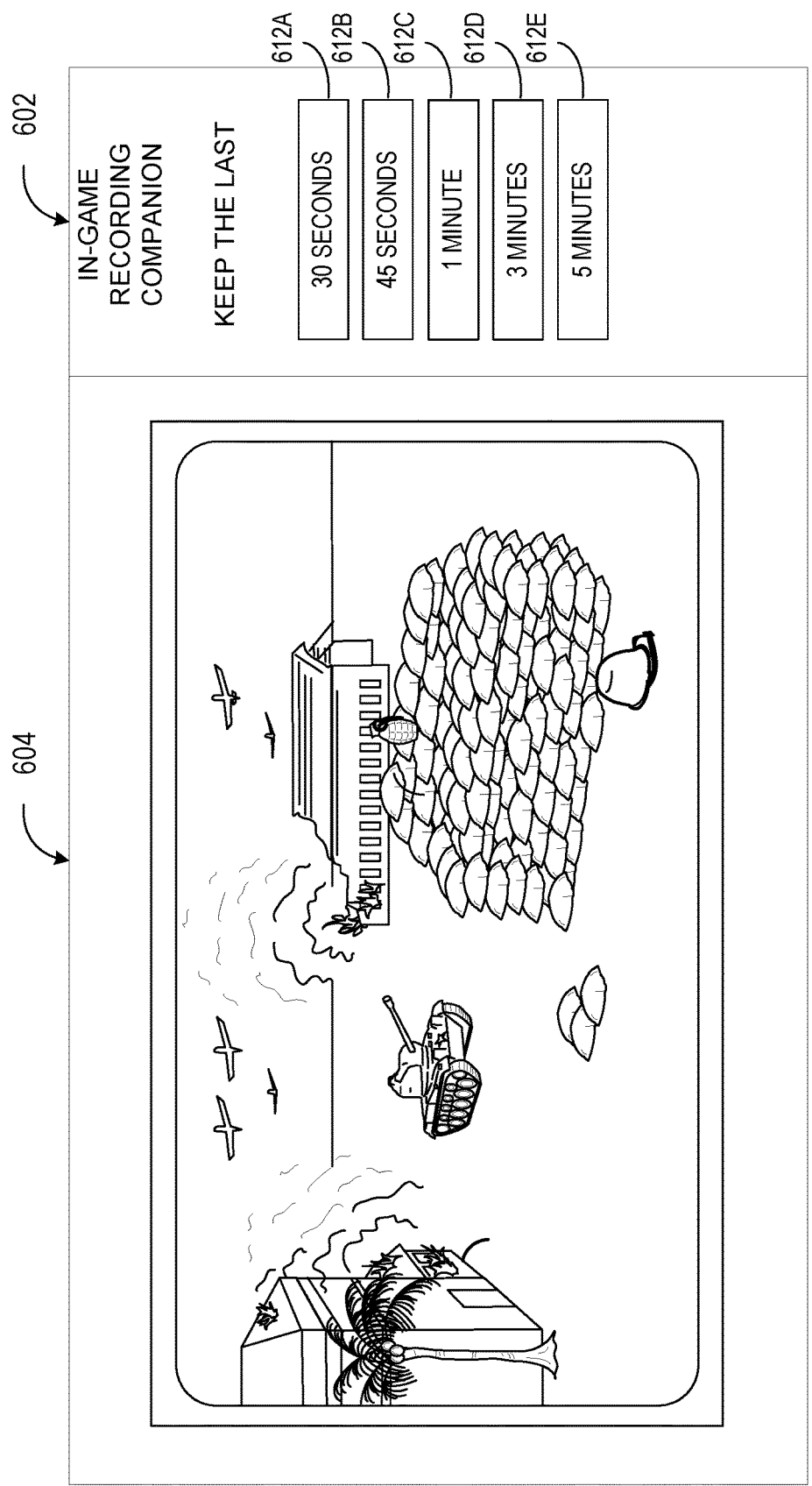

FIG. 7 shows another aspect of in-game recording companion 602. Flexible options are provided to set a recording length duration. For example, executable objects 612A, 612B, 612C, 612D, and 612E each may be configured to effectuate setting a duration of the segment of active gameplay saved by the platform-level in-game recording companion. These options may be provided when a user selects a command to end a clip, for example. Thumbnails optionally may be provided from the buffer containing the most recently played portions of active gameplay to show what was occurring at the beginning of each of the listed intervals. For example, the executable objects may take the form of thumbnails, or thumbnails may be displayed adjacent to the executable objects. The platform-level in-game recording companion may provide executable objects specifying a duration of active gameplay preceding the receipt of a command to save the segment, a duration of active gameplay following the receipt of the command to save the segment, or both preceding and following such that receipt of the command to save the segment occurs within the saved segment of active gameplay.

Figure 8:
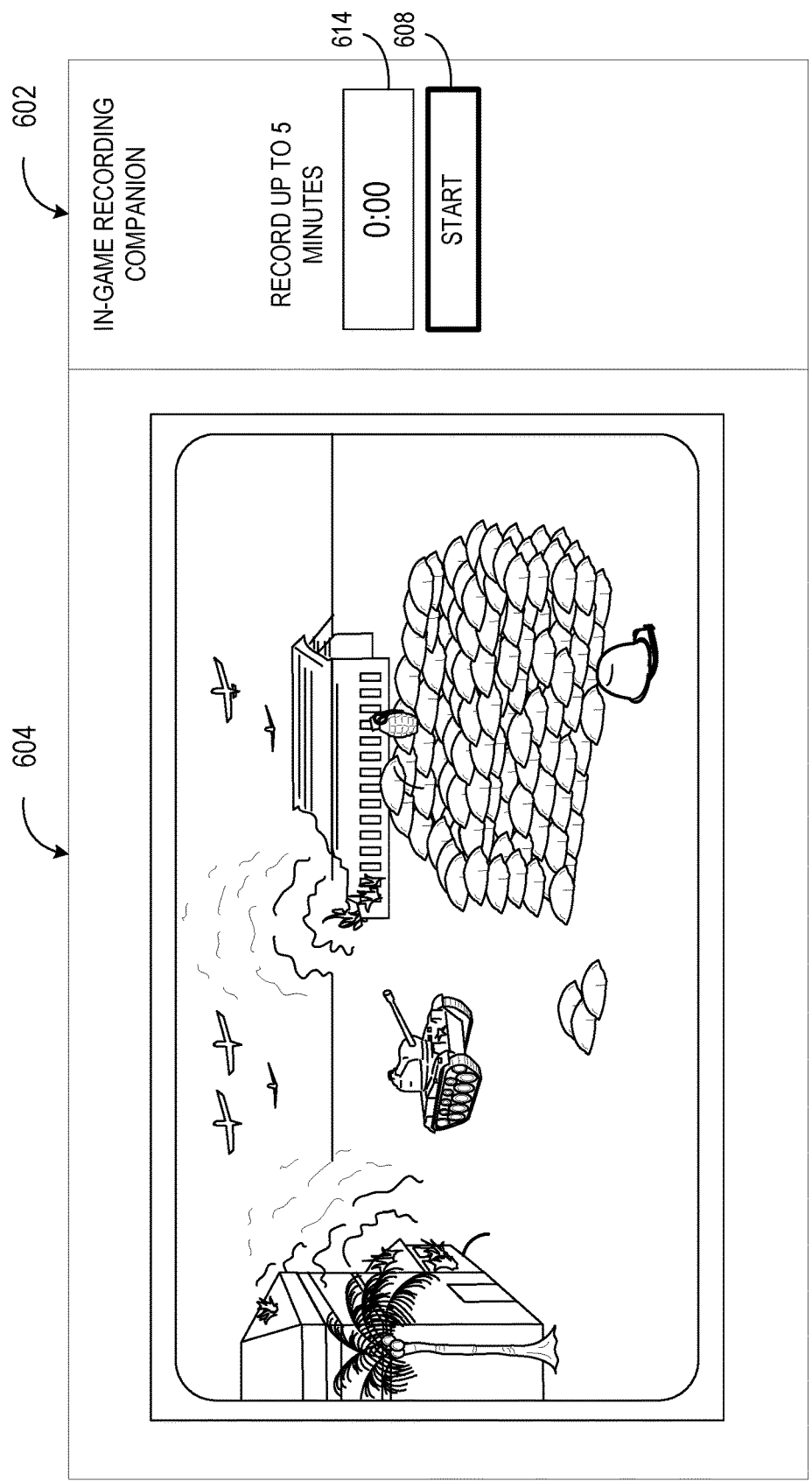
Figure 9:
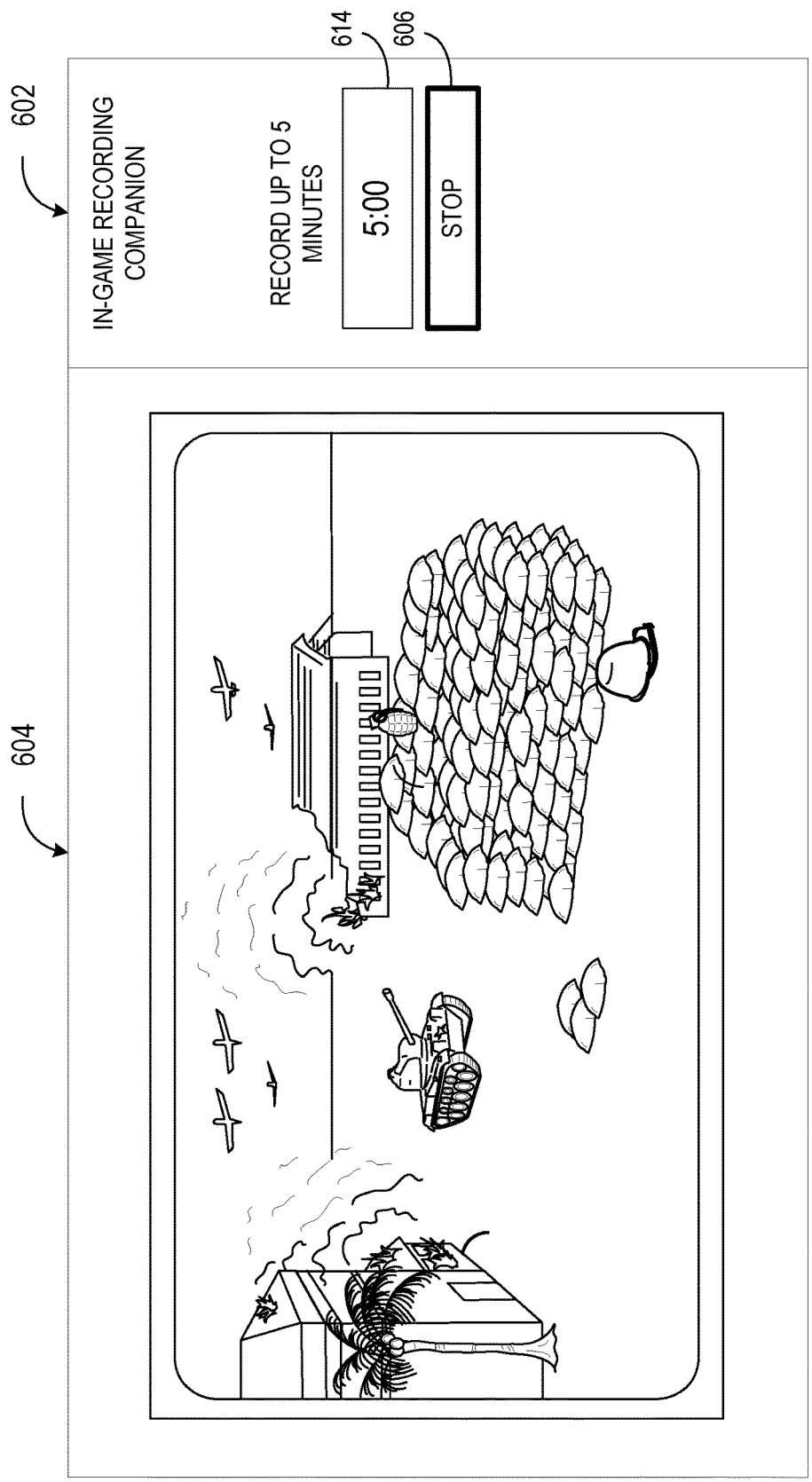

FIGS. 8 and 9 show other aspects of the interface of the platform-level in-game recording companion 602. Specifically, FIG. 8 shows a view in which a user is provided an executable start object 608 to indicate the beginning of a segment of active gameplay from the currently playing video game 604 as it is rendered. Additionally, interface 602 may include a timer 614 providing an elapsed time since beginning the segment. In addition to providing an indication of a duration of a current segment of active gameplay, timer 614 may also provide a direct or indirect indication of the remaining capacity of the temporary storage buffer. FIG. 9 shows options for indicating the endpoint of the segment of active gameplay from the currently playing video game 604. As discussed above for FIG. 8, timer 614 indicates a current duration of the segment of active gameplay to be saved. Executable stop object 606 may be actuated effectuating a command indicating the endpoint of the segment of active gameplay.

The various options provided in FIGS. 6-9, as well as other in-game recording options, may be controlled remotely using a companion experience through a linked companion device.

Figure 11:
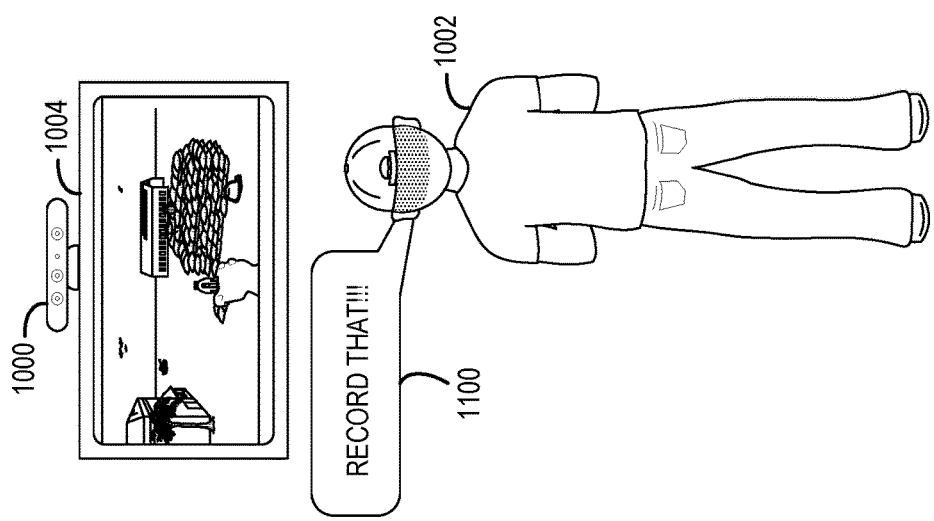
Figure 10:
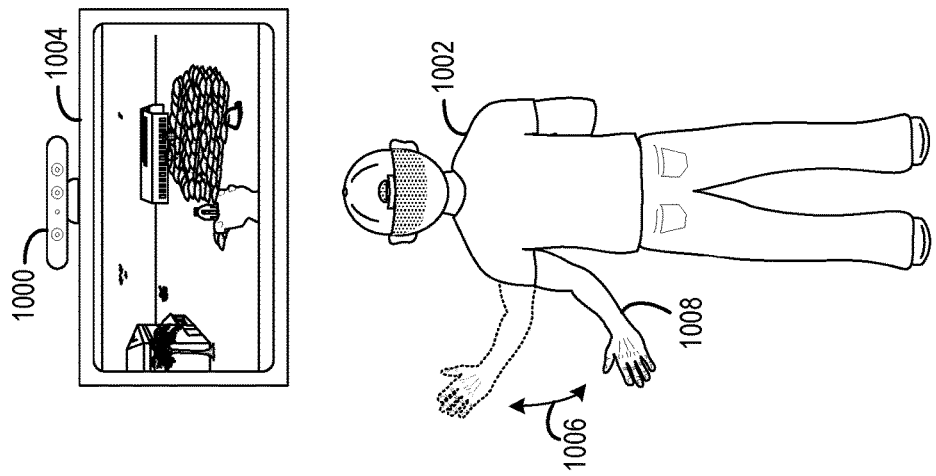

FIGS. 10 and 11 show an example scenario where a natural user input (NUI) interface system 1000 monitors an environment including a human subject 1002. The NUI interface system is positioned above a display 1004. The NUI interface system 1000 and the display 1004 are operatively coupled with a computer gaming device (not shown). The NUI interface system 1000 may be configured to image the environment as well as detect audio in the environment.

FIG. 10 shows an example scenario where the human subject 1002 performs a waving gesture 1006 with his arm 1008. The waving gesture 1006 may be recognized by the NUI interface system 1000 as a command that triggers the saving of a segment of active gameplay of a currently playing video game. The NUI interface system 1000 sends an indication of the gesture to the platform-level in-game recording companion. In response to receiving the indication, the platform-level in-game recording companion saves the segment of active gameplay from the most recently played portion of rendered gameplay or indicates a beginning or end point of the segment of active gameplay as the gameplay is rendered. The waving gesture is not limiting. Other gestures may be used.

FIG. 11 shows an example scenario where the human subject 1002 speaks a phrase 1100 (e.g., "RECORD THAT!!!", "START RECORD!!!", or "STOP RECORD!!!"). The spoken phrase may be recognized by the NUI interface system 1000 as a voice command that triggers the saving of a segment of active gameplay from a currently playing video game. The NUI interface system 1000 sends an indication of the command to the platform-level in-game recording companion. In response to receiving the indication, the platform-level in-game recording companion saves the segment of active gameplay from the most recently played portion of active gameplay or indicates the beginning or endpoint of the segment of active gameplay as the gameplay is rendered.

Figure 12:
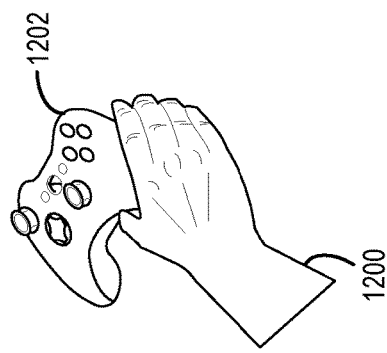
FIGS. 10-12 show examples of different user initiated in-game save commands that trigger saving of a gameplay segment.

FIG. 12 shows a scenario where a hand 1200 of a user is holding a gamepad controller 1202. The gamepad controller 1202 may be operatively coupled with the computer gaming device (not shown). The user may provide input to the gamepad controller 1202 that indicates a command to save a segment of active gameplay. The gamepad controller 1102 sends an indication of the command to the platform-level in-game recording companion. In response to receiving the indication, the platform-level in-game recording companion saves the segment of active from the most recently played portion of active gameplay or indicates the beginning or endpoint of the segment of active gameplay as the gameplay is rendered. For example, the user input may include a particular combination of buttons to trigger saving the segment of active gameplay. In some implementations, the combination of buttons may be the same for any of the different video games.

FIG. 13 illustrates a companion computing device 1306 usable to remotely effectuate issuance of a command to save a segment of active gameplay from a currently playing video game and/or save segments of other types of content. As shown, computer gaming device 1302 displays active gameplay 1304 of a basketball video game, and companion computing device 1306 displays a platform-level in-game recording companion user interface 1308. In such an implementation, the computer gaming device may send the user interface 1308 for the platform-level in-game recording companion to companion computing device 1306 via the network. User interface 1308 may include an executable stop object 1312 configured to effectuate a command indicating an endpoint of the segment of active gameplay, an executable start object 1314 configured to indicate a beginning of the segment of active gameplay, and an executable display object 1316 configured to effectuate viewing of the library of the platform-level in-game recording companion. Additionally, user interface 1308 may include timer 1310 or any other suitable executable objects that may be used to control the saving, displaying, editing, etc. of a segment of active gameplay via the platform-level in-game recording companion user interface 1308. The companion computing device 1306 may be used in conjunction with computer gaming device 1302 to provide a secondary gaming experience that enhances gameplay of a video game. Non-limiting examples of companion computing device 1306 include a portable gaming device, a mobile computing device, a tablet computer, and a smartphone.

In one example, the user provides input to the companion computing device that indicates a command to the platform-level in-game recording companion. The user interface 1308 is sent from the computer gaming device to the companion computing device 1306. An executable object is actuated effectuating issuance of a command to save a segment of active gameplay (e.g., directly via wired or wireless communication, or via a network accessible service in communication with the companion computing device 1306 and computer gaming device 1302. In response to receiving the command, the platform-level in-game recording companion saves the segment of active gameplay from the most recently played portion of active gameplay. Alternately, start executable object 1314 or stop executable object 1312 may be actuated effectuating the issuance of commands indicating the beginning or endpoint of the segment of active gameplay as the gameplay is rendered. In another example, the user provides input to the companion computing device 1306 that indicates a command to the platform-level in-game recording companion. For example, a user actuates executable display object 1316 to effectuate viewing the library of the platform-level in-game recording companion in order to view a recently saved segment of active gameplay. The command is sent from the companion computing device 1306 to the platform-level in-game recording companion on the computer gaming device via the in-game recording companion user interface 1308. In response to receiving the command, the platform-level in-game recording companion commands the computer gaming device and/or the companion computing device to display the library of the platform-level in-game recording companion. The user may then select the segment of active gameplay to be viewed. It will be noted that while the companion computing device 1306 is shown being used in conjunction with a computer gaming system playing a video game, the companion computing device may be used with other computing systems and may be used with types of video content other than video games.

In some implementations, the methods and processes described herein may be tied to a computing system of one or more computing devices. In particular, such methods and processes may be implemented as a computer-application program or service, an application-programming interface (API), a library, and/or other computer-program product.

Figure 14:
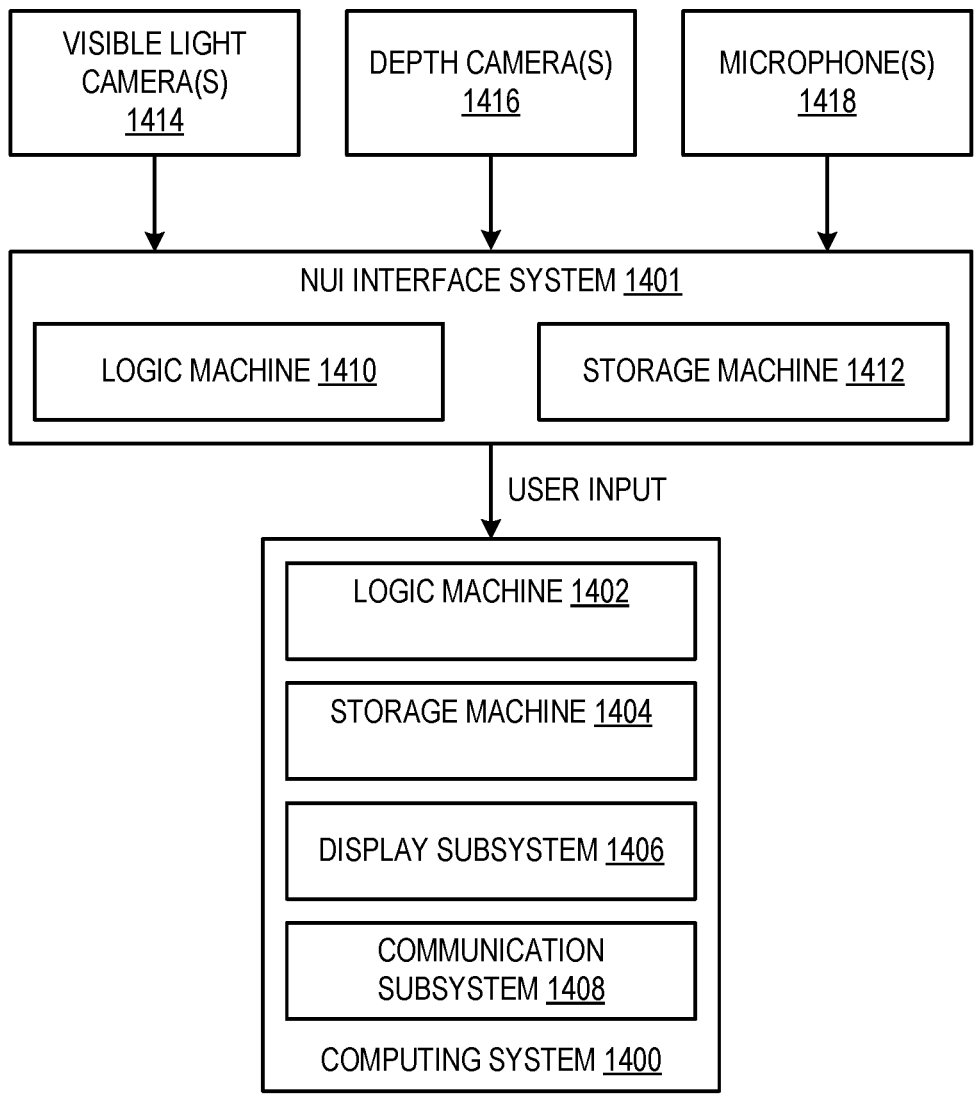
FIG. 14 shows a computer gaming system and a natural user interface (NUI) system according to an implementation of this disclosure.

FIG. 14 schematically shows a non-limiting implementation of a computer gaming system 1400 that can enact one or more of the methods and processes described above. Computer gaming system 1400 is shown in simplified form. Computer gaming system 1400 may take the form of one or more console game systems, personal computers, server computers, tablet computers, home-entertainment computers, network computing devices, gaming devices, mobile computing devices, mobile communication devices (e.g., smart phone), and/or other computing devices. For example, computer gaming system 1400 may take the form of computer gaming device 100 shown in FIG. 1 or companion computing device 1306 shown in FIG. 13.

Computer gaming system 1400 includes a logic machine 1402 and a storage machine 1404. Computer gaming system 1400 may optionally include a display subsystem 1406, a communication subsystem 1408, and/or other components not shown in FIG. 14.

Logic machine 1402 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 1404 includes one or more physical devices configured to hold instructions executable by the logic machine to implement the methods and processes described herein. When such methods and processes are implemented, the state of storage machine 1404 may be transformed—e.g., to hold different data.

Storage machine 1404 may include removable and/or built-in devices. Storage machine 1404 may include optical memory (e.g., CD, DVD, HD-DVD, Blu-Ray Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 1404 may include volatile, nonvolatile, dynamic, static, read/write, read-only, random-access, sequential-access, location-addressable, file-addressable, and/or content-addressable devices.

It will be appreciated that storage machine 1404 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 1402 and storage machine 1404 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computer gaming system 1400 implemented to perform a particular function. In some cases, a module, program, or engine may be instantiated via logic machine 1402 executing instructions held by storage machine 1404. For example, the platform-level in-game recording companion may be instantiated via logic machine 1402 executing instructions held by storage machine 1404. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 1406 may be used to present a visual representation of data held by storage machine 1404. This visual representation may take the form of a graphical user interface (GUI). As the herein described methods and processes change the data held by the storage machine, and thus transform the state of the storage machine, the state of display subsystem 1406 may likewise be transformed to visually represent changes in the underlying data. Display subsystem 1406 may include one or more display devices utilizing virtually any type of technology. Such display devices may be combined with logic machine 1402 and/or storage machine 1404 in a shared enclosure, or such display devices may be peripheral display devices.

When included, input subsystem 1408 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1408 may be configured to communicatively couple computer gaming system 1400 with one or more other computing devices. Communication subsystem 1408 may include wired and/or wireless communication devices compatible with one or more different communication protocols. As non-limiting examples, the communication subsystem may be configured for communication via a wireless telephone network, or a wired or wireless local- or wide-area network. In some implementations, the communication subsystem may allow computer gaming system 1400 to send and/or receive messages to and/or from other devices via a network such as the Internet.

As noted above, an NUI interface system 1401 may be configured to provide user input to computer gaming system 1400. To this end, the NUI interface system includes a logic machine 1410 and a storage machine 1412. To detect the user input, the NUI interface system receives low-level input (i.e., signal) from an array of sensory components, which may include one or more visible light cameras 1414, depth cameras 1416, and microphones 1418. Other example NUI componentry may include one or more infrared or stereoscopic cameras; a head tracker, eye tracker, accelerometer, and/or gyroscope for motion detection and/or intent recognition; as well as electric-field sensing componentry for assessing brain activity. In some implementations, the NUI interface system may comprise or interface with one or more user-input devices such as a keyboard, mouse, touch screen, or game controller.

The NUI interface system processes the low-level input from the sensory components to yield an actionable, high-level input to computer gaming system 1400. Such action may generate corresponding text-based user input or other high-level commands, which are received in computer gaming system 1400. In some implementations, NUI interface system and sensory componentry may be integrated together, at least in part. In other implementations, the NUI interface system may be integrated with the computer gaming system and receive low-level input from peripheral sensory components.

An example provides, on a computer gaming system, a digital video recording method for video games. The method may be executed on a computer gaming device configured to play a plurality of different video games. The method comprising overseeing active gameplay of a video game of the plurality of different video games with a platform-level in-game recording companion that executes separately from any of the plurality of different video games. During active gameplay of the video game, the active gameplay is continuously and automatically buffered to a temporary storage buffer of the computer gaming device. The method further comprises, during active gameplay of the video game, receiving a command to save a segment of the active gameplay for subsequent viewing and, without interrupting active gameplay of the video game, saving the segment of the active gameplay from the temporary storage buffer to a library of the platform-level in-game recording companion. In such an example, receiving the command may additionally or alternatively include receiving a voice command via a microphone. In such an example, receiving the command may additionally or optionally include receiving a command sent from a companion computing device via a network. In such an example, receiving the command may additionally or alternatively include recognizing a programmatically defined trigger event within the active gameplay. In such an example, the segment of active gameplay may additionally or alternatively precede the command. In such an example, the segment of active gameplay may additionally or alternatively follow the command. In such an example, receiving the command may additionally or alternatively include receiving a first command indicating a beginning of the segment of the active gameplay and receiving a second command indicating an end point of the segment of the active gameplay. In such an example, the method may additionally or alternatively comprise displaying an interface for the platform-level in-game recording companion in a split screen layout with the active gameplay. The interface may additionally or alternatively include an executable start object configured to effectuate issuance of a command indicating a beginning of the segment of the active gameplay, an executable stop object configured to effectuate issuance of a command indicating an end point of the segment of the active gameplay, and an executable display object configured to effectuate viewing of the library of the platform-level in-game recording companion. In such an example, the method may additionally or alternatively comprise sending an interface for the platform-level in-game recording companion to a companion computing device, where the interface includes an executable start object configured to effectuate issuance of a command indicating a beginning of the segment of the active gameplay, an executable stop object configured to effectuate issuance of a command indicating an end point of the segment of the active gameplay, and an executable display object configured to effectuate viewing of the library of the platform-level in-game recording companion. In such an example, buffering the active gameplay may additionally or alternatively include receiving from a camera image data of a user temporally corresponding to the segment of active gameplay, receiving from a microphone audio data of a user temporally corresponding to the segment of active gameplay, and buffering the image data and the audio data to the temporary storage buffer. In such an example, the method may additionally or alternatively comprise upon saving a first segment of the active gameplay to the library of the platform-level in-game recording companion and during active gameplay, receiving a second command to save a second segment of the active gameplay for subsequent viewing, where the second segment of active gameplay includes active gameplay not included in the first segment of active gameplay, and without any interruption in active gameplay of the video game from the first segment of active gameplay to the second segment of active gameplay, saving the second segment of the active gameplay from the temporary storage buffer to a library of the platform-level in-game recording companion independent of the first segment. Any or all of the above-described examples may be combined in any suitable manner in various implementations.

Another example provides, on a computer gaming system, a digital video recording method for video games. The method may be executed on a computer gaming device configured to play a plurality of different video games. The method comprising overseeing active gameplay of a video game of the plurality of different video games with a platform-level in-game recording companion that executes separately from any of the plurality of different video games. During active gameplay of the video game, the active gameplay is continuously and automatically buffered to a temporary storage buffer of a random access memory device of the computer gaming device. The method further comprises, during active gameplay of the video game, receiving a command to save a segment of the active gameplay for subsequent viewing where the command is sent from a companion computing device via a network and, without interrupting active gameplay of the video game, saving the segment of the active gameplay from the temporary storage buffer of the random access memory device to a library of the platform-level in-game recording companion. In such an example, the segment of active gameplay may additionally or alternatively precede the command. In such an example, the segment of active gameplay may additionally or alternatively follow the command. In such an example, the method may additionally or alternatively comprise sending an interface for the platform-level in-game recording companion to a companion computing device, where the interface includes an executable start object configured to effectuate issuance of a command indicating a beginning of the segment of the active gameplay, an executable stop object configured to effectuate issuance of a command indicating an end point of the segment of the active gameplay, and an executable display object configured to effectuate viewing of the library of the platform-level in-game recording companion. In such an example, receiving the command may additionally or alternatively include receiving a first command indicating a beginning of the segment of the active gameplay and receiving a second command indicating an end point of the segment of the active gameplay. In such an example, buffering the active gameplay may additionally or alternatively include receiving from a camera image data of a user temporally corresponding to the segment of active gameplay, receiving from a microphone audio data of a user temporally corresponding to the segment of active gameplay, and buffering the image data and the audio data to the temporary storage buffer. In such an example, the method may additionally or alternatively comprise upon saving a first segment of the active gameplay to the library of the platform-level in-game recording companion and during active gameplay, receiving a second command to save a second segment of the active gameplay for subsequent viewing, where the second segment of active gameplay includes active gameplay not included in the first segment of active gameplay, and without any interruption in active gameplay of the video game from the first segment of active gameplay to the second segment of active gameplay, saving the second segment of the active gameplay from the temporary storage buffer to a library of the platform-level in-game recording companion independent of the first segment. Any or all of the above-described examples may be combined in any suitable manner in various implementations.

In another example, a storage machine holding instructions executable by a logic machine to instantiate a platform-level in-game recording companion that executes separately from any of a plurality of different video games is provided. The platform-level in-game recording companion is configured to oversee active gameplay of a video game of the plurality of different video games and, during active gameplay of the video game, continuously and automatically buffer the active gameplay to a temporary storage buffer of a random access memory device. During active gameplay of the video game, receive from a microphone a voice command to save a segment of the active gameplay for subsequent viewing, and without interrupting active gameplay of the video game, save the segment of the active gameplay from the temporary storage buffer of the random access memory device to a library of the platform-level in-game recording companion. In such an example, the storage machine may additionally or alternatively hold instructions where the platform-level in-game recording companion is further configured to, upon saving a first segment of the active gameplay from the temporary storage buffer of the random access memory storage device to the library of the platform-level in-game recording companion and during active gameplay, receive a second voice command to save a second segment of the active gameplay for subsequent viewing, where the second segment of active gameplay includes active gameplay not included in the first segment of active gameplay, and without any interruption in active gameplay of the video game from the first segment of active gameplay to the second segment of active gameplay, save the second segment of the active gameplay from the temporary storage buffer of the random access memory storage device to a library of the platform-level in-game recording companion independent of the first segment. Any or all of the above-described examples may be combined in any suitable manner in various implementations.

It will be understood that the configurations and/or approaches described herein are exemplary in nature, and that these specific implementations or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A digital video recording method for video games, the method comprising:
   on a computer gaming device configured to play a plurality of different video games, overseeing active gameplay of a video game of the plurality of different video games with a platform-level in-game recording companion that executes separately from any of the plurality of different video games;
   during active gameplay of the video game, continuously and automatically buffering the active gameplay to a temporary storage buffer of the computer gaming device;
   during active gameplay of the video game, receiving a command to save a segment of the active gameplay for subsequent viewing;
   while displaying gameplay of the video game, displaying an interface for the platform-level in-game recording companion; and
   saving the segment of the active gameplay from the temporary storage buffer to a library of the platform-level in-game recording companion.

2. The method of claim 1, wherein the command to save the segment of the active gameplay is received from a game controller.

3. The method of claim 1, wherein the platform-level in-game recording companion is an application that runs while the video game is played.

4. The method of claim 1, wherein the platform-level in-game recording companion is part of an operating system.

5. The method of claim 1, wherein the active gameplay is buffered in the temporary storage buffer after rendering.

6. The method of claim 1, wherein the active gameplay is buffered in the temporary storage buffer before rendering.

7. The method of claim 1, wherein the interface for the platform-level in-game recording companion includes an executable start object configured to effectuate issuance of a command indicating a beginning of the segment of the active gameplay.

8. The method of claim 1, wherein the interface for the platform-level in-game recording companion includes an executable stop object configured to effectuate issuance of a command indicating an end point of the segment of the active gameplay.

9. The method of claim 1, wherein the interface for the platform-level in-game recording companion includes an executable edit object configured to effectuate issuance of a command to edit the segment of the active gameplay.

10. The method of claim 1, wherein the interface for the platform-level in-game recording companion includes an executable display object configured to effectuate viewing of the library of the platform-level in-game recording companion.

11. The method of claim 1, wherein the interface for the platform-level in-game recording companion includes an executable display object specifying a duration of active gameplay preceding the receipt of a command to save the segment.

12. The method of claim 1, wherein the interface for the platform-level in-game recording companion includes an executable display object specifying a duration of active gameplay following the receipt of the command to save the segment.

13. The method of claim 1, wherein the interface for the platform-level in-game recording companion is displayed to a side of the active gameplay.

14. The method of claim 1, wherein gameplay of the video game is displayed with full game action while the interface for the platform-level in-game recording companion is displayed.

15. The method of claim 1, wherein gameplay of the video game is displayed without pausing while the interface for the platform-level in-game recording companion is displayed.

16. The method of claim 1, wherein gameplay of the video game is displayed without stopping while the interface for the platform-level in-game recording companion is displayed.

17. The method of claim 1, wherein gameplay of the video game is displayed in focus while the interface for the platform-level in-game recording companion is displayed.

18. A video game console system, comprising:
a game controller including one or more buttons; and
a computer gaming device including:
  a temporary storage buffer;
  a long term storage device;
  an input subsystem configured to recognize activation of each of the one or more buttons of the game controller; and
  a logic machine configured to separately execute a plurality of different video games and a platform-level in-game recording companion, wherein the platform-level in-game recording companion is configured to:
    continuously and automatically buffer, to the temporary storage buffer, a video of active gameplay of a currently-executing video game of the plurality of different video games;
    display an interface for the platform-level in-game recording companion while displaying gameplay of the currently-executing video game; and
    save, from the temporary storage buffer to the long term storage device, a segment of the video of active gameplay of the currently-executing video game responsive to the input subsystem recognizing activation of a button of the one or more buttons of the game controller.

19. The video game console system of claim 18, wherein the interface for the platform-level in-game recording companion is displayed responsive to activation of a button of the one or more buttons of the game controller.

20. A computing device, comprising:
a logic machine; and
a storage machine holding instructions executable by the logic machine to instantiate a platform-level in-game recording companion that executes separately from any of a plurality of different video games, the platform-level in-game recording companion configured to:
  oversee active gameplay of a currently-executing video game of the plurality of different video games;
  during active gameplay of the currently-executing video game, continuously and automatically buffer the active gameplay to a temporary storage buffer;
  during active gameplay of the currently-executing video game, receive a command to save a segment of the active gameplay for subsequent viewing;
  while displaying gameplay of the currently-executing video game, display an interface for the platform-level in-game recording companion; and
  save the segment of the active gameplay from the temporary storage buffer to a library of the platform-level in-game recording companion.

* * * * *